US008669883B2

(12) United States Patent
Paines

(10) Patent No.: US 8,669,883 B2
(45) Date of Patent: Mar. 11, 2014

(54) VISUAL LANDING AIDS

(75) Inventor: Justin David Billot Paines, Ansty (GB)

(73) Assignee: Qinetiq Limited (GB)

( * ) Notice: Subject to any disclaimer, the term of this patent is extended or adjusted under 35 U.S.C. 154(b) by 341 days.

(21) Appl. No.: 13/054,934

(22) PCT Filed: Aug. 7, 2009

(86) PCT No.: PCT/GB2009/001946
§ 371 (c)(1),
(2), (4) Date: Jan. 19, 2011

(87) PCT Pub. No.: WO2010/020751
PCT Pub. Date: Feb. 25, 2010

(65) Prior Publication Data
US 2011/0121997 A1    May 26, 2011

(30) Foreign Application Priority Data

Aug. 16, 2008  (GB) .................... 0815031.0
Oct. 30, 2008  (GB) .................... 0819871.5

(51) Int. Cl.
G08G 5/00    (2006.01)
G01C 19/00   (2013.01)

(52) U.S. Cl.
USPC ........... 340/953; 340/947; 340/950; 340/956; 73/178 T

(58) Field of Classification Search
USPC ................. 340/947, 950, 953, 956; 73/178 T
See application file for complete search history.

(56) References Cited

U.S. PATENT DOCUMENTS

| 3,003,451 | A | 10/1961 | Lundin et al. |
| 3,279,406 | A | 10/1966 | Ricketts et al. |
| 4,209,768 | A | 6/1980 | Basov et al. |
| 4,259,658 | A | 3/1981 | Basov et al. |
| 4,414,532 | A | 11/1983 | Kaul |
| 5,287,104 | A | 2/1994 | Shemwell |
| 5,904,729 | A | 5/1999 | Ruzicka |
| 6,239,725 | B1 | 5/2001 | Bray |
| 2005/0103938 | A1 | 5/2005 | Butsch et al. |

FOREIGN PATENT DOCUMENTS

| JP | 04085196 | 3/1992 |
| JP | 09188299 | 7/1997 |

Primary Examiner — Steven Lim
Assistant Examiner — Omeed Alizada
(74) Attorney, Agent, or Firm — McDonnell Boehnen Hulbert & Berghoff LLP

(57) ABSTRACT

A visual aid for the pilot of an aircraft approaching to land on an aircraft carrier comprises a series of lights (9) embedded along the landing deck and controlled in response to pitch and heave of the vessel so that the light(s) illuminated at any time indicate a visual aim point which is stabilised with respect to a specified glideslope (5) onto the vessel irrespective of such vertical excursions of the vessel. It is used in conjunction with a marker on a head up display or helmet mounted display for example so that registry of the marker with the illuminated light at any time indicates that the aircraft is on the correct glideslope.

13 Claims, 4 Drawing Sheets

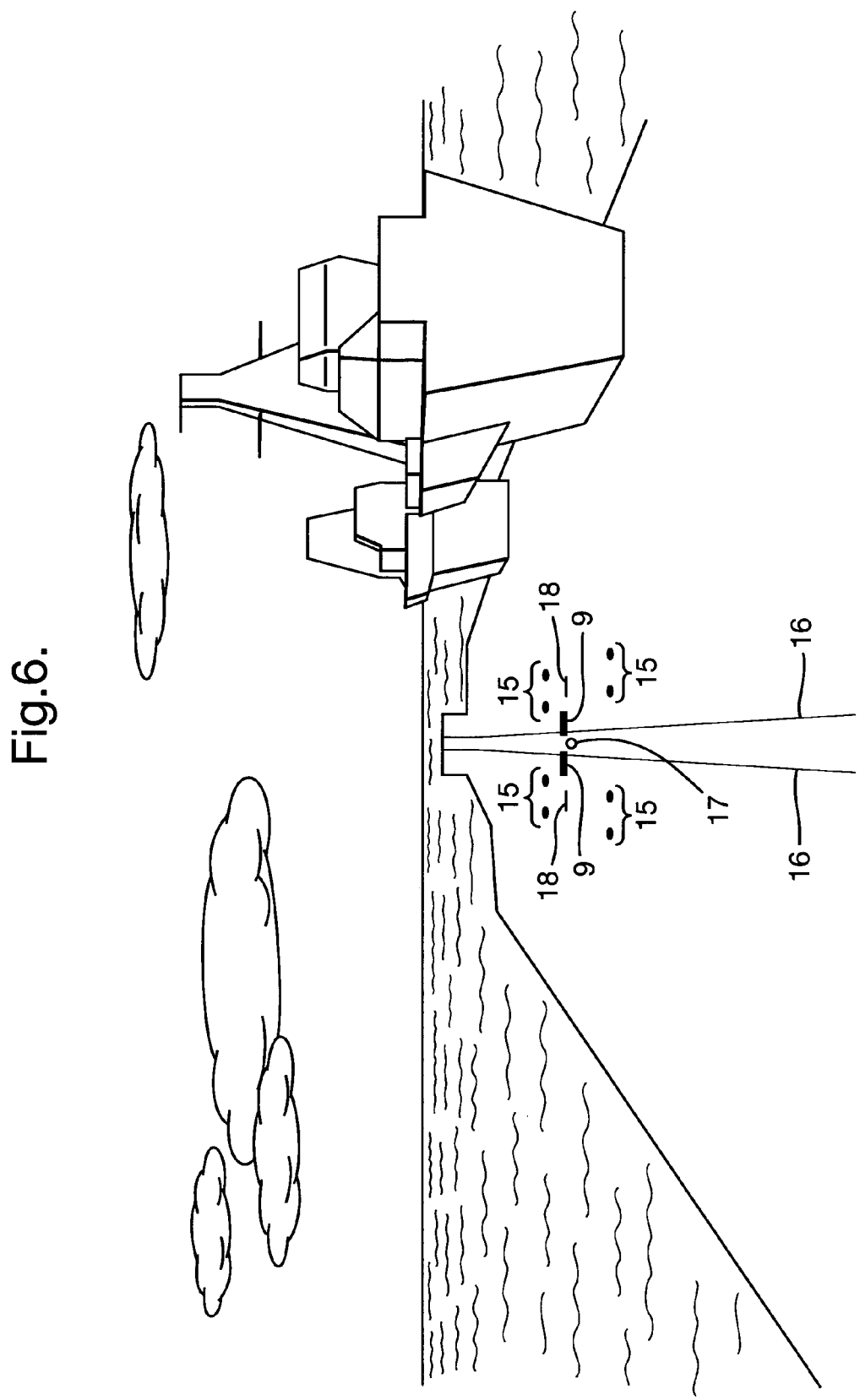

VISUAL LANDING AIDS

FIELD OF THE INVENTION

The present invention relates to visual landing aids (VLAs) and more particularly to a visual aid for the pilots of aircraft approaching to land on moving platforms, notably vessels at sea such as aircraft carriers or other ships which can accommodate aircraft landings of the type more particularly described herein.

BACKGROUND OF THE INVENTION

The invention has been conceived particularly, though not exclusively, as an aid for use in executing shipboard rolling vertical landings. The so-called rolling vertical landing (RVL) is a type of landing executed by vectored-thrust vertical/short takeoff and landing (V/STOL) and short takeoff and vertical landing (STOVL) aircraft as an alternative to a normal vertical landing, in which the aircraft approaches at an angle to the ground and at relatively slow speed (in comparison to conventional fixed-wing landings) under a combination of jet-borne and wing-borne lift. Aircraft of this class include the well known V/STOL Harrier and Sea Harrier "jump jet" variants, and the STOVL F-35B variant of the Lightning II yet to enter service. The RVL was developed originally as a manoeuvre for landing on unprepared areas in land-based operations so that debris disturbed by the jet efflux would tend to be blown behind the aircraft and not into the engine intakes. It is also considered to be a useful technique for shipboard operations, however, due to the ability to land with a higher aircraft weight than would be possible in the same meteorological conditions if a vertical landing was to be used, or to land at the same weight but with a reduced power setting as compared to the vertical landing thereby potentially increasing engine life. Other benefits can include a reduction in the erosion of deck coverings by engine exhaust as compared to vertical landings. While conceived with shipboard RVLs by V/STOL and STOVL aircraft in mind, however, the present invention may also find application as an aid for conventional (wire-arrested) fixed wing carrier-borne landings which are typically conducted with shallower approach angles and at substantially higher speeds than RVLs, and also for helicopter landings if not performed vertically.

Note: all references in this specification to landing directions, approach angles, glideslopes etc. in the context of landings on vessels which may be underway are to those directions, angles, glideslopes etc. relative to the overall moving platform and not to the actual movement of the aircraft through the air.

A VLA currently in service with some navies for conventional fixed wing carrier-borne landings is the so-called Improved Fresnel Lens Optical Landing System (IFLOLS). This comprises a set of lights located on the deck offset laterally from the runway and directed towards approaching aircraft. There is a horizontal row of datum lights to either side of a central vertical column of indicator lights which are selectively lit so that at any time the position of the illuminated indicator light (known as the "ball") relative to the datum lights indicates to the pilot whether he is above, below or upon a specified glideslope. This can be stabilised for pitch, roll and heave of the deck with the apparatus being tilted on gimbals as required to maintain its indication of the correct glideslope. It requires the pilot to scan laterally away from the runway centreline to use the aid, however, and significant training is required in order to prevent pilots from inadvertently reacting instead to deck motion, known as "deck spotting". It is also expensive to maintain due to the number of moving parts, and occupies useful deck space.

SUMMARY OF THE INVENTION

The present invention, on the other hand, seeks to provide a VLA which imposes a lower mental workload on the pilot and consequently involves less of a training burden than the IFLOLS, does not require him to scan laterally away from the runway, and in a preferred embodiment involves no moving parts and does not occupy otherwise useful desk space.

The invention is predicated on the provision of a visual aim point on the platform which when in registry with a visual marker on or in the aircraft indicates that the aircraft is on a specified glideslope to touch down at a point related to the aim point. With any such arrangement it is however necessary to consider the effect of excursions of the platform in the vertical sense for which purpose reference will be made to the accompanying schematic FIGS. 1 and 2 (not to scale and wherein for ease of illustration the depicted glideslopes are much steeper than those which can be expected in practice).

FIG. 1 indicates in full line the deck 1 of an aircraft carrier in a nominal level (equilibrium) condition and the line 2 indicates the glideslope down which an aircraft 3 has to fly with the deck in this condition to arrive at a specified mainwheel touchdown point 4 at a specified approach angle. Suppose the vessel pitches with the bow down and the stern up so that the deck is now in the attitude indicated in chain line, 1A. The touchdown point 4 is accordingly now above its position in space with the level deck and the glideslope down which the aircraft would have to fly in this condition to arrive at the same point 4 at the specified approach angle is indicated by the line 2A. Conversely suppose the vessel pitches with the bow up and the stern down so that the deck is now in the attitude indicated in chain line, 1B. The touchdown point 4 is accordingly now below its position in space with the level deck and the glideslope down which the aircraft would have to fly in this condition to arrive at the same point 4 at the specified approach angle is indicated by the line 2B. In other words it will be appreciated that if the pilot is to attempt to touch down at the specified point 4 while the vessel is pitching he will have to constantly adjust the position of his glideslope throughout the approach. This could be achieved by following a fixed visible aim point on the deck (in practice located somewhat forward of the point 4 in the usual case where the pilot is accommodated forward of the main landing gear) but would place a significant burden on the pilot at a critical phase of his mission. Similar considerations apply to excursions of the deck 1 in the vertical sense due to other ship motions, notably heave, or to any combination of causes.

FIG. 2 illustrates an alternative approach where instead of requiring touchdown at a single fixed point on the deck 1 the glideslope 5 is itself stabilised in space. It follows that for the illustrated range of deck excursions there will be a range of possible touchdown points depending on where the deck intersects the glideslope at the actual moment of touchdown. For example with a level deck 1 touchdown will occur at point 6, with the deck raised as at 1A touchdown will occur further aft at point 7, and with the deck depressed as at 1B touchdown will occur further forward at point 8.

It is to an approach of the kind exemplified in FIG. 2 that the present invention is directed and it will be appreciated from the foregoing discussion that the use of a single fixed aim point on the deck will be insufficient to establish the aircraft on the desired fixed glideslope when subject to excursions in the vertical sense due to pitch, heave or the like.

Accordingly in one aspect the invention resides in a visual aid for the pilot of an aircraft approaching to land on a moving platform comprising means for defining a visual aim point on the platform and means for adjusting the apparent position of such visual aim point along the platform in response to excursions of the platform in the vertical sense so that registry of the visual aim point with an associated visual marker on or in the aircraft at any time indicates that the aircraft is on substantially the same specified glideslope fixed in space relative to the overall platform irrespective of such excursions thereof.

The visual aim point in such an arrangement could be represented by a distinctive object which is physically translated back and forth along the platform as required in use of the aid, or even an object which is moved vertically up and down from a fixed position on the platform (but would have to be fully retracted at the moment of touchdown or would represent a collision hazard). Preferably however the aid comprises an array of lights which are distributed along the platform and arranged to be lit selectively to indicate the position of the aim point at any time.

In one arrangement the aim point indicator lights are arranged in a row or parallel rows along the platform and controlled such that the light in the or each row which is nearest to the intended aim point at any time is lit. In another, those lights are arranged in a row or parallel rows along the platform and controlled such that a single light is lit in the or each row when the intended aim point is within a specified distance of that light and two successive lights are lit in the or each row when the intended aim point is within a specified distance of the mid point between those two lights. In any event, lights may also be lit to indicate the effective limits of the array at any time.

An array of aim point indicator lights may also extend along a length of the platform such that different longitudinal sections thereof are capable of functioning to provide an adjustable aim point for a plurality of specified glideslopes fixed in space in different positions along the platform.

Typically the associated visual marker on or in the aircraft will be presented in a head up display (HUD) or helmet mounted display (HMD) and comprise a marker representing a depression angle from the horizon equal to the specified glideslope angle. Other arrangements are possible, however, such as an equivalent marker in a cockpit display from a forward-looking camera or simply a physical marker on part of the aircraft structure which is positioned relative to the pilot eye-point at the required fixed depression from the horizon when the aircraft is in the correct approach attitude.

In another aspect the invention resides in a visual aid for the pilot of an aircraft approaching to land on the deck of an aircraft carrier or the like vessel comprising means for defining a visual indication on the deck and means for adjusting the apparent position of such visual indication along the deck in response to excursions of the vessel in pitch so that when viewed along a specified sightline from the aircraft said indication corresponds to the aftmost limit at which the aircraft will safely clear the stern of the vessel when following a specified glideslope parallel to said sightline irrespective of such excursions of the vessel.

In another aspect the invention resides in a method of approaching to land an aircraft on a moving platform by use of a visual aid as defined above.

DESCRIPTION OF THE DRAWINGS

The invention will now be more particularly described, by way of example, with reference to the following accompanying drawings, in which:

FIG. 6 indicates an example of the pilot's eye view when using a VLA according to the invention.

DESCRIPTION OF THE INVENTION

Figure 1:
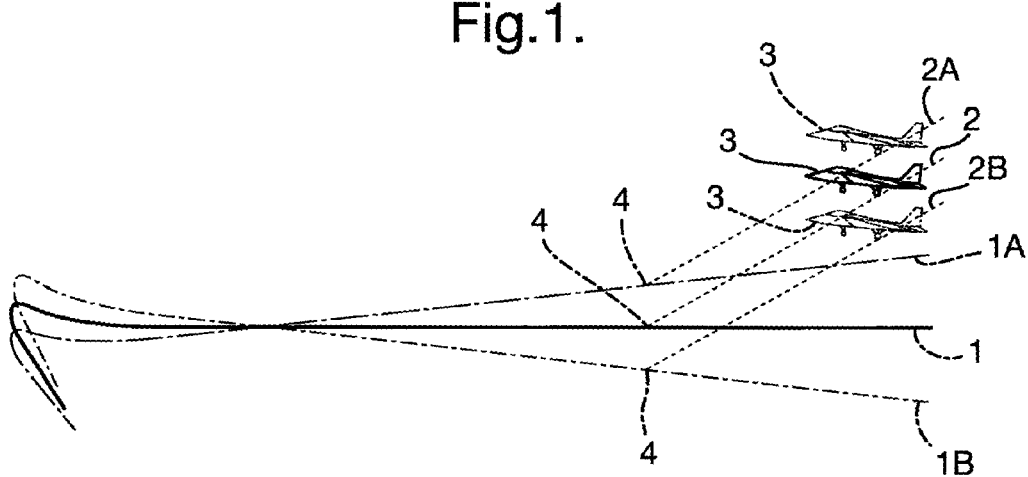
FIG. 1 depicts one approach to landing on an aircraft carrier deck in which touchdown is made at a single fixed point on the deck.
Figure 2:
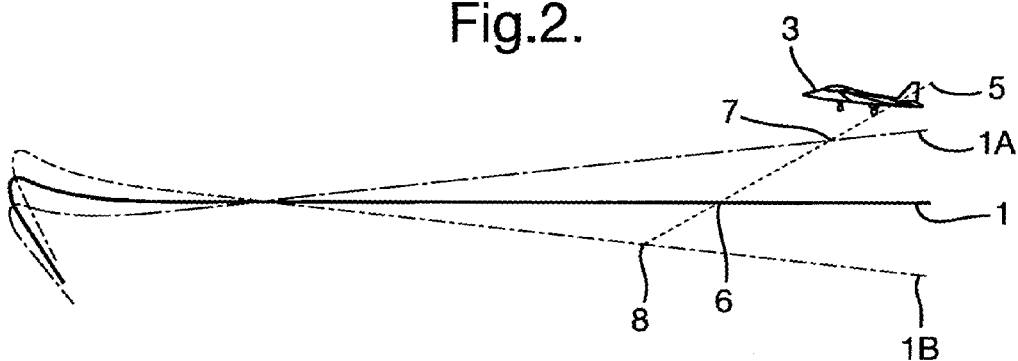
FIG. 2 depicts an alternative approach to landing on an aircraft carrier deck wherein the glideslope is stabilized in space.
Figure 3:
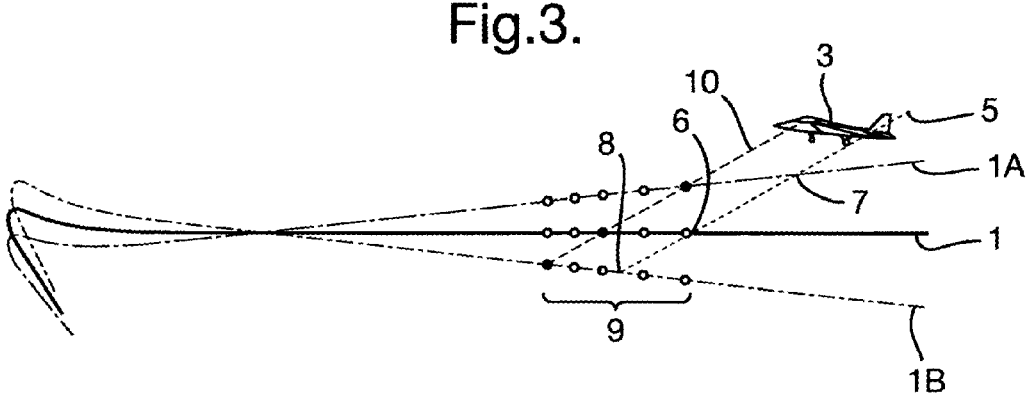
FIG. 3 illustrates the principle of the invention schematically and not to scale (and wherein for ease of illustration the depicted glideslope is much steeper than that which can be expected in practice), as implemented with an array of indicator lights.

Referring to FIG. 3 the aircraft 3 is shown with a specified mainwheel glideslope 5 fixed in space relative to the deck 1 and a possible range of touchdown points such as 6, 7 and 8 corresponding to a range of vertical deck excursions similarly to FIG. 2. Let into the deck along a length forwardly offset from the touchdown point range is an array of aim point indicator lights 9. In the course of the approach the pilot observes the lights 9 in conjunction with a marker presented in, say, a HUD or HMD and representing a depression angle from the horizon equal to the angle of the glideslope 5, or in other words along a sightline 10 parallel to the glideslope. As the deck pitches, heaves or otherwise moves in the vertical sense the lights 9 are selectively illuminated so that at any time only that light which is on (or closest to) the intended sightline 10 is lit, as indicated in the Figure ("filled" light=lit). For example in the nominal level deck condition (1) the central light is lit, at the maximum upward deck excursion (1A) with which the system is intended to operate the rearmost light is lit, at the maximum downward deck excursion (1B) with which the system is intended to be used the foremost light is lit, and so on. In other words while the aim point represented by the illuminated light moves relative to the deck as the deck moves up and down with ship pitch, heave etc it remains in a substantially fixed position with respect to an observer in the plane of the glideslope 5 (i.e. as viewed along the sightline 10), and by controlling the aircraft to keep whichever light is lit in registry with his specified HUD/HMD marker the pilot can be confident that the aircraft is correctly following the glideslope 5.

Figure 4:
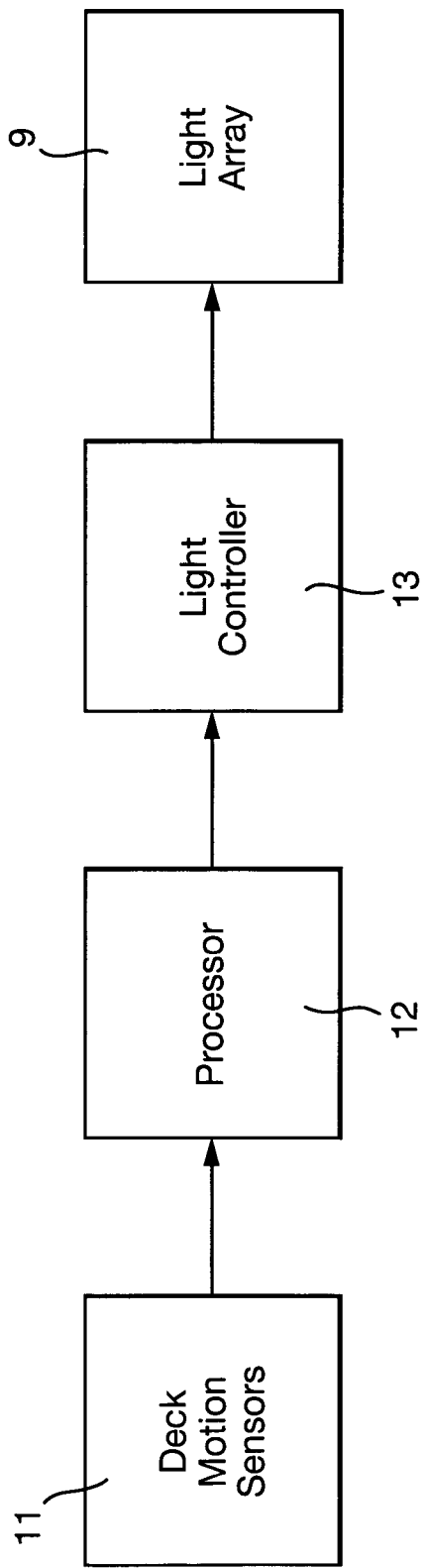
FIG. 4 is a schematic block diagram of the control system for the indicator lights in a VLA according to the invention.

As schematically illustrated in FIG. 4, in order to control the illumination of the lights 9 for the above purpose information on the motion of the deck is derived from a suite of conventional inertial and/or ring laser gyro and/or satellite positioning sensors 11 and fed to a processor 12 which computes the correct position within the light array to illuminate from this data and knowledge of the desired glideslope. The processor drives a light controller 13 which in turn switches power to whichever of the lights 9 is to be illuminated at any time.

Figure 5:
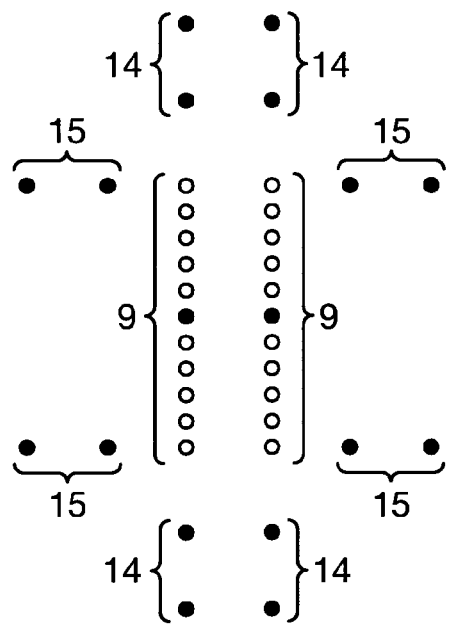
FIG. 5 is a plan view of one embodiment of an indicator light array for use in a VLA according to the invention.

FIG. 5 illustrates one practical example of an aim point light array for use in a VLA according to the invention. In this case the indicator lights 9 are arranged in pairs to either side of the runway centreline, in a "tramline" arrangement, and conventional "tramline" lights (typically at greater longitudinal spacings than the aim point lights 9) are also seen at 14.

Extra lateral lights as shown at 15 can also be provided to indicate the limits of the aim point array.

FIG. 6 indicates an example of the pilot's eye view when approaching to land on an aircraft carrier and using an aim point light array similar to that of FIG. 5. "Tramlines" 16 are painted on the deck to either side of the runway centreline. Lights similar to those indicated at 14 in FIG. 5 will be spaced along these "tramlines" but are not shown separately in FIG. 6. Two lateral rows of limit lights 15 are however shown and between them a pair of illuminated aim point lights 9 which in this case are bar shaped, the other members of the aim point light array which are not illuminated at the instant depicted in FIG. 6 not being shown. HUD symbology visible to the pilot is also shown including a ship referenced velocity vector symbol (circle) 17 and a marker (pair of bars) 18 representing a depression angle from the horizon corresponding to the desired glideslope angle; (other conventional HUD symbology which will usually be present in the pilot's display is omitted for ease of illustration). In principle the invention can be used with any practical glideslope angle which may be chosen in any case with regard to the operational requirements, prevailing meteorological conditions, aircraft performance and characteristics etc. In the example of FIG. 6, however, a 6° angle is assumed, which is considered to be a practical option for shipboard RVLs. The HUD 6° marker 18 is shown to be in near registry with the illuminated aim point lights 9 showing that the aircraft is established on the correct glideslope to within an acceptable degree of error.

The VLA according to the invention and exemplified by FIG. 6 offers a compelling visual cue which can be easily and intuitively interpreted by pilots without significant specific training. In simulation trials pilots have found it relatively easy to follow the guidance provided by this aid without being distracted by deck motion. Unlike the IFLOLS it allows the pilot to concentrate his visual scan through the HUD or HMD without having to scan to a laterally offset position to use the aid. The array of aim point indicator lights need not involve any moving parts and should have much lower maintenance costs than the IFLOLS. The individual lights can be let into the deck and provide no obstruction to the aircraft on its landing rollout or to any other movements on the deck. The light array can easily be made night vision device compatible and support operations during both day and night.

Returning to FIG. 5, the required overall length of the aim point indicator light array 9 is determined by (i) the maximum range of deck excursions in the vertical sense that can be expected under the conditions in which the aid is to be used and (ii) the desired glideslope angle. For example from consideration of typical aircraft carrier deck motion data it is estimated that a total length of around 120 ft (36.6 m) would be required for operation in up to sea state 6 ("very rough"—significant wave height 4-6 m) with a 6° glideslope angle. In use the length of the array will be apparent to the pilot from the presence of the limit lights 15 and the position along the array of the indicator light pair which is illuminated at any time can provide situational awareness of deck motion, as well as an early indication (as the aim point comes close to the end of the array) that the deck motion is approaching a maximum condition and likely to reverse its direction or else continue to an out-of-limits condition because sea conditions have exceeded those for which the aid is designed or for which it is safe to land. The limit lights 15 may also be caused to flash to give an unequivocal signal to the pilot if such an out-of-limits situation arises. Knowledge of the limits of the array indicated by the lights 15 can also allow the pilot to assess easily if any error in his sightline is on the safe side of the aim point or the reverse (an error on the safe side would be with the HUD/HMD marker lagging the aim point as it moves towards one of the limits of the array).

While FIG. 5 depicts a discrete light array which may be installed at a specified location on the deck, however, it may be desirable to provide an array which can cater for a range of different fixed glideslope positions relative to the deck so as to guide landing aircraft to touchdown further forward or aft depending on operational requirements or meteorological conditions. This can be provided by extending the array of lights 9 along the deck to the extent required but only using a section of it as the "active" array at any time. The limits of the "active" array could be indicated by providing additional lateral sets of limit lights 15 along the deck although this would increase the cost and complexity of the installation and constrain the range of possible "active" arrays unless a large number were installed. A simple alternative would be to use pairs of the aim point indicator lights 9 themselves permanently lit to indicate the limits of the "active" array at any time (or flashing in the event that an out-of-limits situation arises as discussed above for the limit lights 15). In any event the ultimate forward and rearward limits of any such array(s) as described herein will be determined having regard to (i) the distance required for the aircraft to safely come to a stop after touchdown sighted by the foremost aim point (it being understood that aircraft conducting SRVLs will not be wire-arrested) and (ii) ensuring that the aircraft safely clears the stern of the ship in its anticipated worst-case pitched up condition when sighting on the rearmost aim point.

It is also proposed that the aft limit of the array can itself be "active" in that it is calculated in real time from the sensed deck pitch motion and may accordingly move forward or back, with corresponding illumination of the applicable array lights 9 to indicate the aftmost possible position of the aim point for safe stern clearance on the specified glideslope under the actual conditions prevailing at any time. For example if the stern pitches up the aft limit will move forward, while the aim point will be moving aft in this situation. Should the two positions meet the corresponding array lights will flash as described above to signal that the glideslope is no longer stabilised and unless the pilot alters the flightpath of the aircraft to keep the HUD/HMD depressed aim marker within a specified degree of error of the flashing array lights, stern clearance is, at least temporarily, not guaranteed. The pilot may choose to abort the approach. An advantage of this "active" aft limit indication is that it ensures protection against a stern strike under all actually prevailing conditions and it follows that the nominal aim point can be positioned further aft, e.g. to maximise the available rollout distance, than when using a fixed array limit for which an additional safety margin must be built in to cater for possible, but unlikely, worst-case conditions. To avoid possibly distracting constant motion of an "active" aft limit, however, it could also be controlled to remain fixed in a location where it does not compromise the aim point location for the majority of deck motion but is able to move forward should deck motion dictate.

An "active" aft limit indication as discussed above may also have utility in situations where it is desired to provide stern clearance confidence to pilots approaching to land on an aircraft carrier or the like but not necessarily in combination with a stabilised aim point, and is consequently an independent aspect of the present invention.

Figure 7:
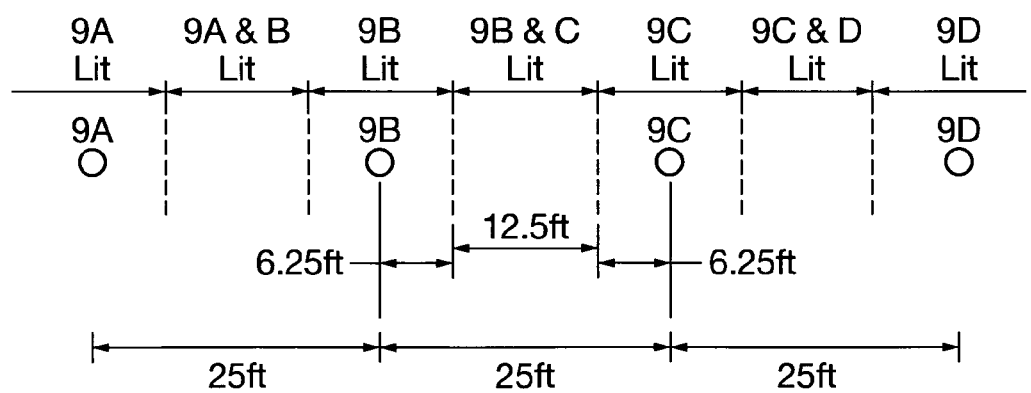
FIG. 7 illustrates an optional lighting logic for use in a VLA according to the invention.

It will be appreciated that the "resolution" of an aim point indicator light array 9, in terms of the accuracy with which a light actually intersects the sightline 10 at any time and any consequent "steppiness" in the changes between illuminated light positions as perceived by the pilot when established on the correct glideslope, depends on the longitudinal separation between each light pair. Simulator trials have shown that separations in the range of around 12-18 ft (3.7-5.5 m) are quite satisfactory when practised with a 6° glideslope angle. However it is possible to double the separation distance, thereby substantially reducing the number of lights required, and still achieve the same effective resolution, or to double the effective resolution for a given separation distance, if the following lighting logic is used. That is to say FIG. 7 shows four members 9A-9D of an array of this kind along one of the "tramlines" and instead of lighting only one of the lights at any time depending on which is nearest to the intended aim point neighbouring pairs are lit when the intended aim point is nearer to the point half way between the pair than to an individual light (the companion light in the other "tramline" being treated equally in each case). Thus if the distance between successive lights is, say, 25 ft (7.6 m) as indicated in the Figure then a single light will be lit in each "tramline" if the intended aim point is within the distance of 12.5 ft (3.8 m) centered on that light or two lights will be lit in each "tramline" if the intended aim point is within that distance centered on the mid point between those two lights. Simulator trials have also shown that this logic to indicate the position of the aim point can readily be assimilated.

The invention claimed is:

1. A visual aid for the pilot of an aircraft approaching to land on a moving platform comprising:
    means for defining a visual aim point on the platform; and
        means for adjusting the apparent position of the visual aim point along the platform wherein the apparent position is adjusted in response to excursions of the platform in the vertical sense so that registry of the visual aim point with an associated visual marker on or in the aircraft at any time indicates that the aircraft is on substantially the same specified glideslope fixed in space relative to the overall platform irrespective of such excursions thereof.

2. An aid according to claim 1 comprising an array of lights distributed along the platform which are arranged to be lit selectively to indicate the position of such aim point at any time.

3. An aid according to claim 2 wherein said lights are arranged in a row or parallel rows along the platform and controlled such that the light in the or each row which is nearest to the intended aim point at any time is lit.

4. An aid according to claim 2 wherein said lights are arranged in a row or parallel rows along the platform and controlled such that a single light is lit in the or each row when the intended aim point is within a specified distance of that light and two successive lights are lit in the or each row when the intended aim point is within a specified distance of the mid point between those two lights.

5. An aid according to claim 2 wherein lights are also lit to indicate the effective limits of said array at any time.

6. An aid according to claim 2 wherein said array extends along a length of the platform such that different longitudinal sections thereof are capable of functioning to provide an adjustable aim point for a plurality of specified glideslopes fixed in space in different positions along the platform.

7. An aid according to claim 1 wherein said visual marker on or in the aircraft is presented in a head up display, helmet mounted display, or forward-looking camera display, or comprises a physical marker on the aircraft structure, and represents a depression angle from the horizon equal to the specified glideslope angle.

8. An aid according to claim 1 for the pilot of an aircraft approaching to land on the deck of an aircraft carrier or the like vessel whereby in use a further visual indication is defined on the deck and the apparent position of such further visual indication is adjusted along the deck in response to excursions of the vessel in pitch so that when viewed along a specified sightline from the aircraft said further indication corresponds to the aftmost limit at which the aircraft will safely clear the stern of the vessel when following a specified glideslope parallel to said sightline irrespective of such excursions of the vessel.

9. A visual aid for the pilot of an aircraft approaching to land on the deck of an aircraft carrier or the like vessel comprising:
    means for defining a visual indication on the deck; and
    means for adjusting the apparent position of such visual indication along the deck in response to excursions of the vessel in pitch so that when viewed in conjunction with a visual marker on or in the aircraft along a specified sightline from the aircraft said indication corresponds to the aftmost limit at which the aircraft will safely clear the stern of the vessel when following a specified glideslope parallel to said sightline irrespective of such excursions of the vessel.

10. A method of approaching to land an aircraft on a moving platform by use of a visual aid according to claim 1.

11. A method according to claim 10 wherein the aircraft is a V/STOL or STOVL aircraft executing a rolling vertical landing.

12. A method of approaching to land an aircraft on the deck of an aircraft carrier by use of a visual aid according to claim 9.

13. A method according to claim 12 wherein the aircraft is a V/STOL or STOVL aircraft executing a rolling vertical landing.

* * * * *